Aug. 7, 1928.
T. MIDGLEY
1,680,162
TIRE BUILDING APPARATUS
Original Filed April 7, 1921   5 Sheets-Sheet 1
 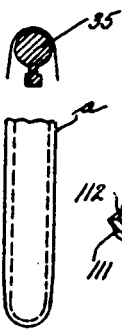 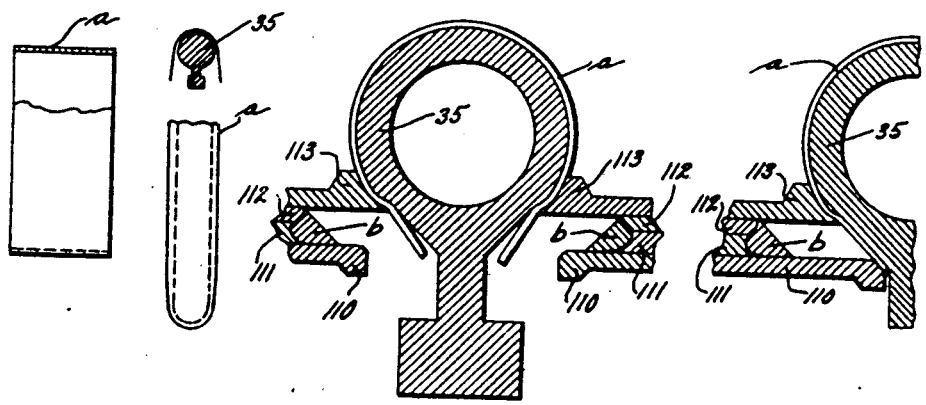 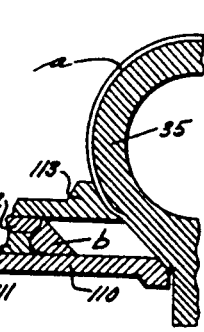
Fig.1  Fig.2  Fig.3  Fig.4
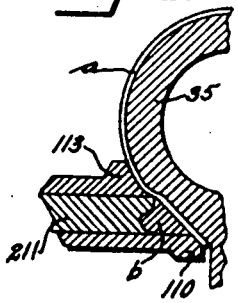 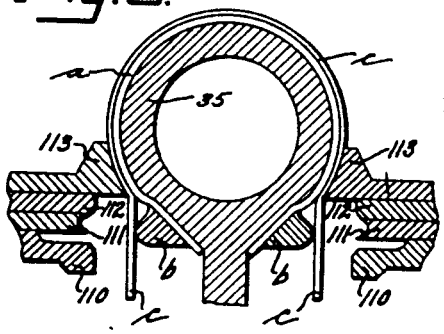 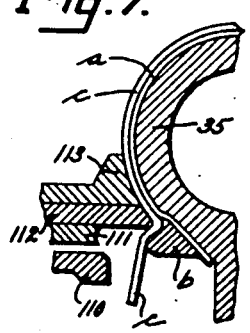
Fig.5  Fig.6  Fig.7
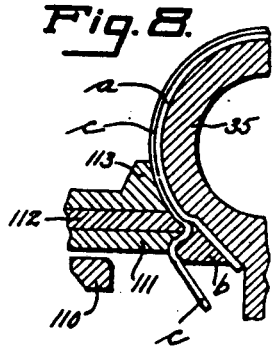 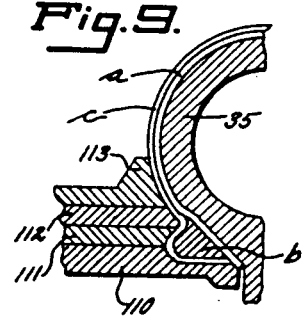
Fig.8  Fig.9
INVENTOR
Thomas Midgley
BY
ATTORNEY

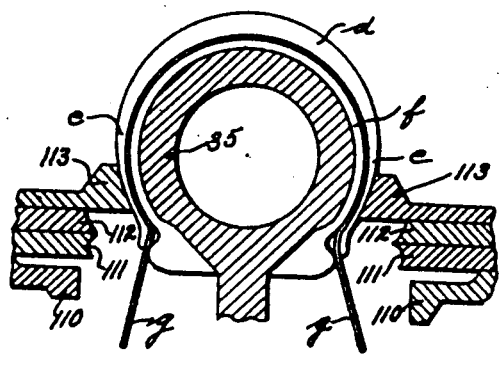
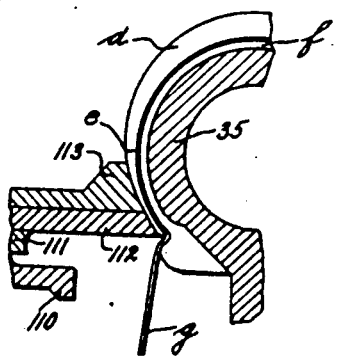
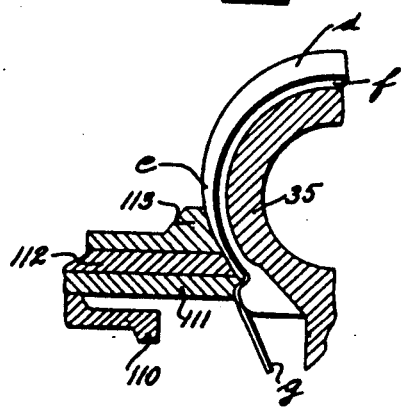
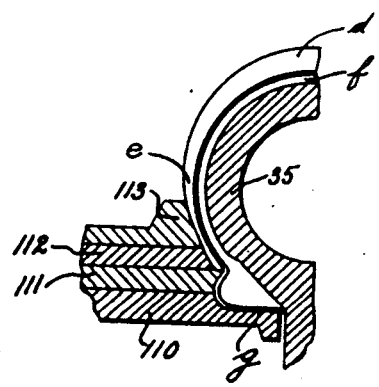

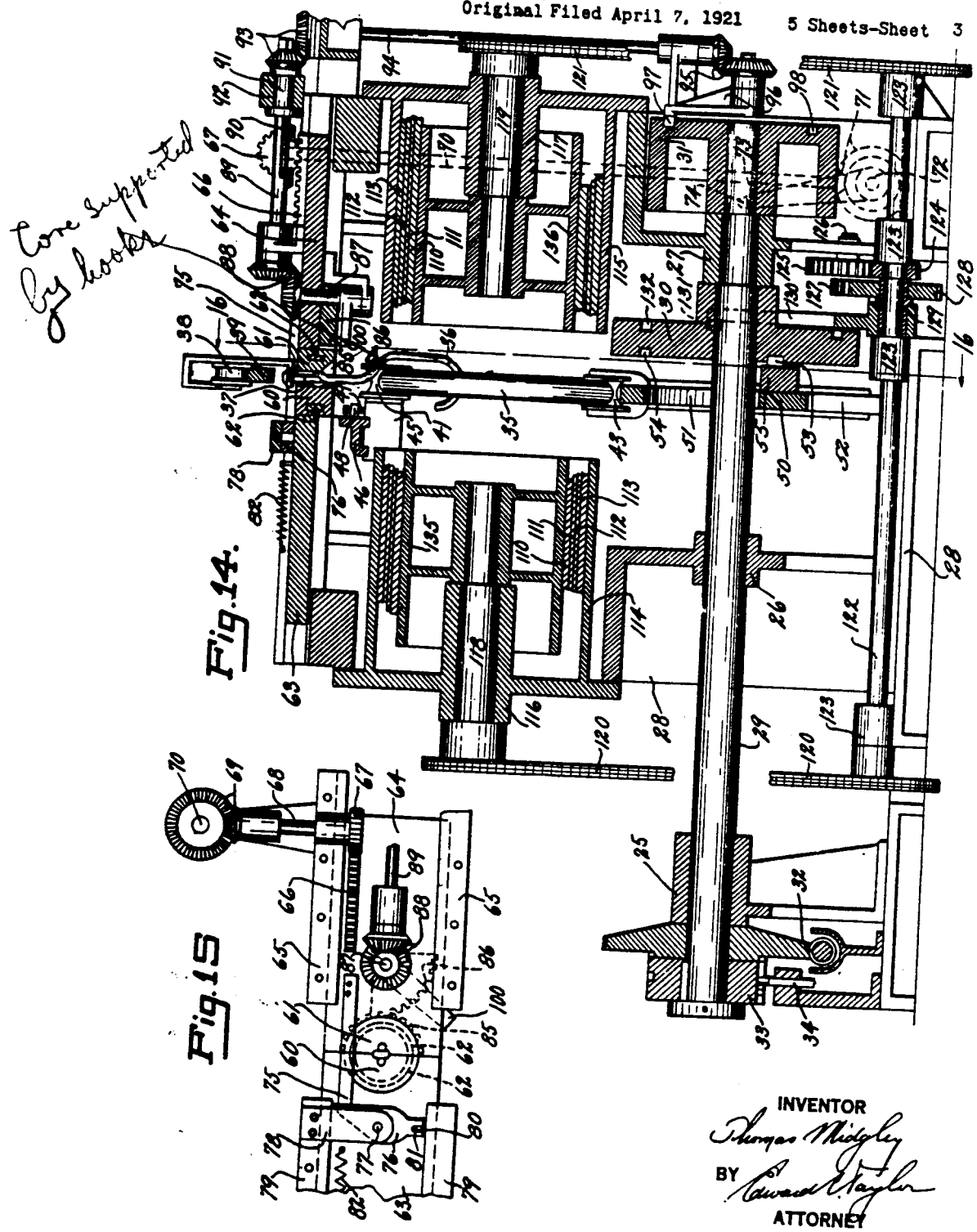

Aug. 7, 1928.

T. MIDGLEY 1,680,162

TIRE BUILDING APPARATUS

Original Filed April 7, 1921     5 Sheets-Sheet 4

INVENTOR
Thomas Midgley
BY
ATTORNEY

Aug. 7, 1928.  
T. MIDGLEY  
1,680,162  
TIRE BUILDING APPARATUS  
Original Filed April 7, 1921  5 Sheets-Sheet 5

INVENTOR  
Thomas Midgley  
BY Edward C Taylor  
ATTORNEY

Patented Aug. 7, 1928.

1,680,162

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Original application filed April 7, 1921, Serial No. 459,330, now Patent No. 1,558,904. Divided and this application filed March 5, 1924. Serial No. 696,954.

My invention relates to the building of the outer tire casings of pneumatic tires, particularly to improvements in methods and machines by which such casings are constructed.

It has for its object the provision of a machine by which casings may be constructed on cores much more effectively than with prior apparatus; which will permit of a more effective division of tire building operations between machines, thereby achieving the numerous advantages attendant upon manufacturing operations in which individual steps of a process are separated and one operator or machine performs one step only; and which will improve the apparatus in many other aspects which will be apparent from the following description. This application is a division of my prior application Serial No. 459,330, filed April 7, 1921, now Patent 1,558,904.

In building a tire casing according to my invention I utilize the carcass building material in the form of rubberized fabric, which term I employ to include square woven fabric, fabric in which warp cords furnish the strength and widely-spaced weft threads merely serve to hold the warp in place during the rubberizing operation, and so-called cord fabric which consists in a warp of cords embedded in a web of rubber with no weft at all. I apply this fabric to the core so as to cause the sides or skirts of the fabric to extend substantially in the plane of the core so that they are in position to be conformed to the sides of the core in the manner to be described. The preferable way of applying the fabric in this condition is by forming it into an endless band, usually of two plies if cord fabric is used, stretching the band from a circumference substantially that of the base of the core to a circumference greater than that of the core at its crest, placing the expanded band about the circumference of the core, and allowing it to contract upon the core and down the sides thereof due to the elasticity inherent in the rubber. With the fabric so mounted upon the core the next operation is to shape it to the undercut sides of the core. This I preferably do by axially applied pressure, preferably exerted through successively acting annular members. When those plies of carcass material which are disposed under the bead are applied, and preferably in conjunction with that operation, the beads may be applied. Successive plies of material may be added and shaped until the complete casing is formed, my invention also contemplating applying the covering materials, by which I refer to the tread and sidewalls, and, if desired, the chafing strips which cover the beads, in a similar manner to the carcass plies.

These steps, as well as the preferred apparatus by which the shaping operations are performed, will appear more clearly from a consideration of the drawings, in which:

Fig. 1 is a view of a band of fabric prior to being expanded over the core;

Fig. 2 is a view of the core with the fabric applied;

Fig. 3 illustrates the first stage in the operation of applying the under-bead plies and the bead fillers;

Figs. 4 and 5 are successively later stages in the same operation;

Figure 16:
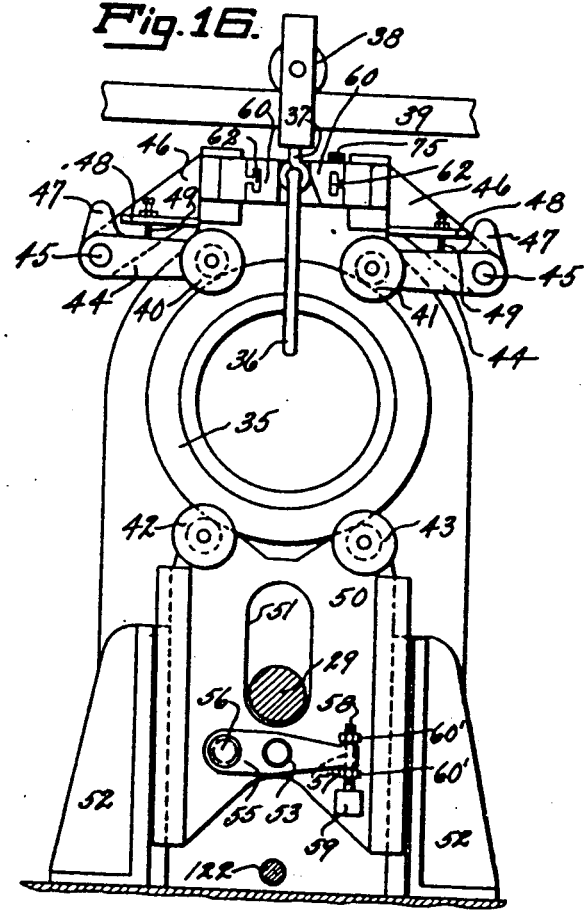
Figure 17:
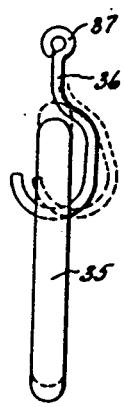
Figure 19:
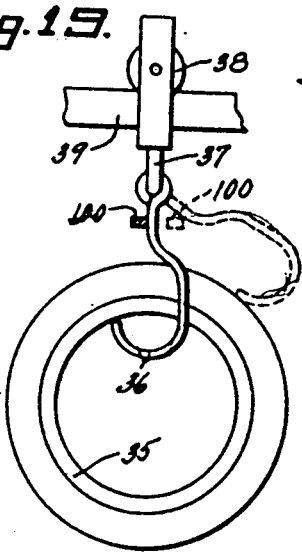
Figure 18:
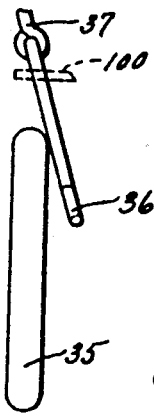
Figure 20:
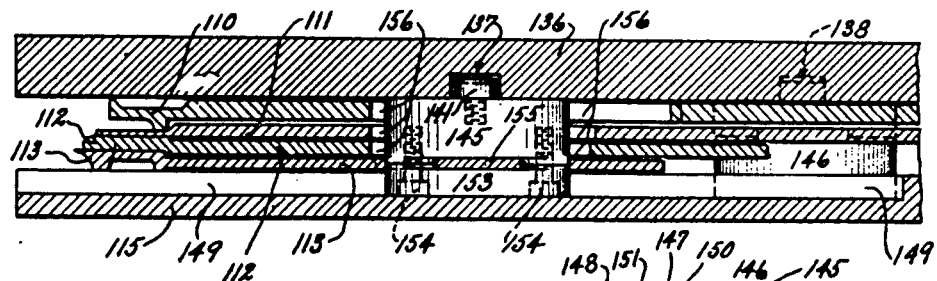
Figure 21:
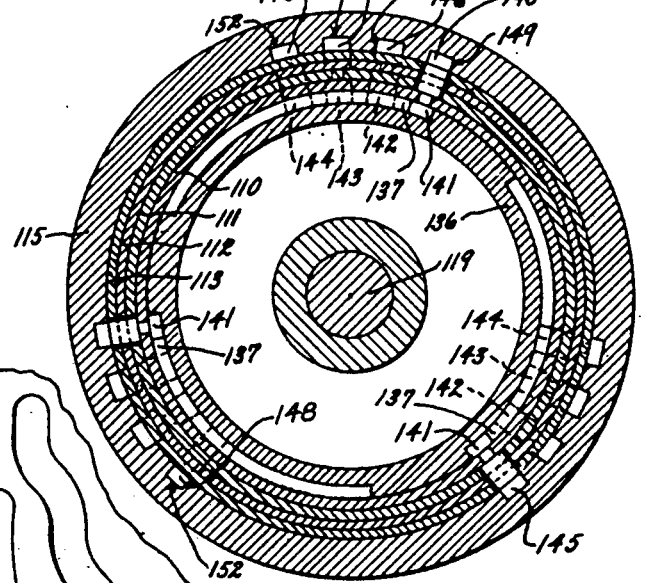

Figs. 6, 7, 8, and 9 illustrate successive stages in the application of the over-bead plies of the carcass;

Figs. 10, 11, 12, and 13 illustrate successive stages in the application of the covering material;

Fig. 14 is a sectional elevation of a machine for carrying out one of the three shaping operations illustrated in the previous figures;

Fig. 15 is a detail top plan thereof;

Fig. 16 is a section on line 16—16 of Fig. 14;

Figs. 17, 18, and 19 are diagrammatic views showing how the core holding hook is moved out of operation prior to the fabric-shaping operation;

Fig. 20 is a detail of the operating connections for the annular pressing members;

Fig. 21 is a transverse section thereof; and

Figure 22:
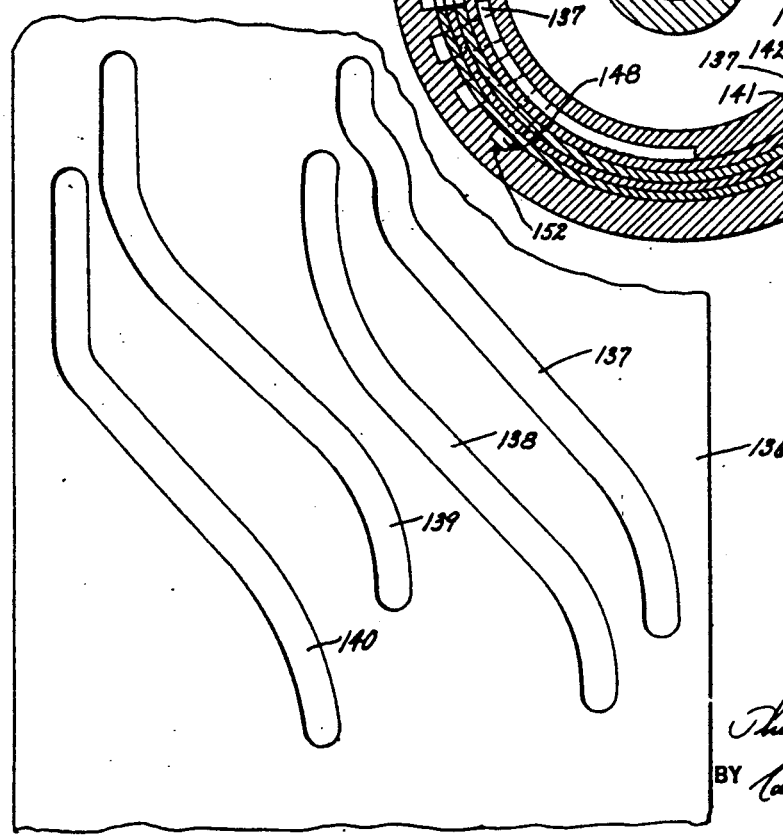

Fig. 22 is a development of a cam.

Before taking up in more detail my improved method of tire building a machine adapted for use in performing some of the steps of the method will be described. Journaled in bearings 25, 26, and 27 in a frame 28 is a main shaft 29 carrying cams 30 and 31 which will be later referred to. This shaft may be driven as through a worm and wheel 32 from a suitable source of power, preferably through a clutch mechanism 33 of the type which, when the control lever 34 is actuated, will permit the mechanism to run through one complete cycle and will then cause it to stop. Such clutches are old, and their construction need not be further described.

Cores 35 are supplied to the machine in any desired or convenient way. In the preferred embodiment of my invention, however, I contemplate supplying the cores on hooks 36 connected by swivels 37 to carriages 38 running on a track 39, and provide mechanism which will now be described for supporting the core and temporarily removing the hook from a position in which it would interfere with the operation of the devices for shaping the fabric to the sides of the core. When the core is delivered to the machine it is stopped approximately in position either by hand or automatically, as by providing track 39 with a depression in which carriage 38 will lodge, and is then grasped by rollers 40, 41, 42, and 43, each of these having concave surfaces conforming to the outside of the core. Rolls 40 and 41 are each rotatably mounted on an arm 44 pivoted at 45 to a bracket 46 on frame 28. An ear 47 on each arm 44 contacts with a ledge 48 on the bracket 46 to limit the downward movement of the rolls, an adjustable stop 49 on ledge 48 limiting the upward movement. The rolls are moved downward by their own weight and upward by contact with the core, which is raised upwardly to free its hook by rolls 42 and 43. These latter rolls are rotatably mounted on a slide 50, which is provided with an aperture 51 enabling it to clear the shaft 29, and which runs on bearings 52 suitably secured in frame 28. A cam roll 53 on the slide fits in a cam groove 54 in one face of cam 30 previously mentioned. In order to adjust accurately the position of the slide 50, cam roll 53 is preferably mounted on an arm 55 pivoted at 56 to the slide and having at its other end a hole 57 through which passes a threaded rod 58 secured to a bracket 59 on the slide. By this means the arm 55 can be rotated on its pivot 56 and held by nuts 60' on the rod in its adjusted position in order to locate accurately the vertical position of the cam roll 53 with respect to slide 50 and hence the position into which the core 35 is raised by the rolls 42 and 43.

After the core has been raised by the mechanism described above from the full line position of Fig. 17 to the dotted line position of the same figure, the hook 36 is free to be moved clear of the core and out of the way of the fabric shaping devices by the hook handling mechanism which will now be described. As the core is placed in the proper position on the track to be seized by rolls 40, 41, 42, and 43, and preferably before rolls 42 and 43 start to raise the core off the hook, the swivel of the hook 70 is grasped by clamping means comprising opposed semi-circular clamping jaws 60 and 61, each slidably mounted on a semi-circular dove-tail guide 62 on slides 63 and 64 respectively. Slide 64 is mounted for reciprocation in guides 65 carried by the frame of the machine, and is provided with a rack 66 meshing with a pinion 67 on a short shaft 68 driven through bevel gears 69 from a vertical shaft 70. This latter shaft receives oscillatory rotation through bevel gears 71 from a shaft 72 carrying arm 73 on which is pivoted a cam roll 74 running in a cam groove on the cylindrical surface of cam 31. This cam, acting through the intermediate mechanism described, serves to move slide 64 toward and away from the center of the machine, whereby clamp 61 is caused to move into and out of clamping position.

Clamp member 60 is moved into and out of clamping position coincidentally with a clamp member 61 by mechanism operated by the motion of slide 64. This slide carries an abutment 75 which, when the slide is moved towards the center of the machine, impinges against a lever 76 pivoted at 77 to a bracket 78 secured to the guides 79 in which slide 63 reciprocates. The end of lever 76 opposite that against which abutment 75 contacts is forked as at 80 to receive a pin 81 mounted on slide 63. Slide 63 is normally held in its retracted or non-clamping position by a spring 82 secured at one end to the slide and at the other to a stationary part of the machine, but as slide 64 is moved toward clamping position the lever 76 acts through pin 81 to move slide 63 into clamping position against the tension of the spring.

Clamps 60 and 61 have mating clamping surfaces which are shaped to conform to the swivel portion of the core supporting hook, and are adapted for rotation on their dove-tail guides 26 in order to swing the hook, when the latter is freed by the raising of the core, from its position transverse to the plane of the core (Figs. 14, 16, and 17), to a position substantially parallel to the plane of the core (Figs. 18 and 19). For this purpose clamping member 61 is provided with gear teeth 85 which mesh with a segmental gear 86 on a shaft 87 journaled in slide 64 and connected by gearing 88 with a horizontal shaft 89. This shaft is splined or keyed as at 90 and passes slidably through a sleeve 91 journaled in a bearing 92 supported by the frame. The sleeve 91 is connected by gearing 93 with a vertical shaft 94, which in turn is connected through gearing 95 with an arm 96 rotatably mounted on the main frame and having a cam roll 97 running in a cam groove 98 in the end face of cam 31. By the above train of mechanism the clamping member 61, and through contact with it clamping member 60, will be rotated so as to turn the hook 36 substantially 90° on its swivel, or from the position of Fig. 17 to that of Fig. 18. Shaft 87 which carries the segmental gear 86 also carries an arm 100 serving to move the hook from the full to the dotted line position of Fig. 19 during the latter part of the rotating movement of the clamping members.

The general operation of the core handling part of the machine is as follows: A core carried by a hook 36 is brought into place ready to be grasped by the positioning rolls, and the swivel of the hook is seized by clamping members 60 and 61. Rolls 42 and 43 are then caused to rise, lifting the core against rolls 40 and 41 so that the core is held in a central position for operation upon by the fabric shaping mechanism. The vertical motion of the core may shift the hook from the full to the dotted line position of Fig. 17, depending upon the shape of the hook. As the core is grasped by its positioning rolls the clamping members 60 and 61 are rotated, swinging the hook from the dotted line position of Fig. 17 to the position shown in Fig. 18 and in full lines in Fig. 19. As or even before this motion is completed arm 100 contacts with the hook and swings it to the dotted line position of Fig. 19 thus leaving the sides of the core free for the operation of the fabric shaping mechanism.

The shaping mechanism may be varied in certain particulars, as will be pointed out, depending on what elements of the tire are to be shaped. The operating mechanism is substantially similar in all cases, and for convenience that arrangement of parts will be described which is suitable for applying the plies of fabric which pass over the bead. The shaping devices themselves comprise a plurality of concentric slides or rings 110, 111, 112, and 113, the number of which may vary depending upon the operation to be performed, and the shape and function of which will be described later. Two opposed sets of these rings are used in order to operate simultaneously upon both sides of the core, one set being mounted in a guiding casing 114 and the other in a guiding casing 115. Journaled in suitable bearings 116 and 117 in the frame, and located respectively in casings 114 and 115 are shafts 118 and 119, each carrying on its exterior end a sprocket whereby it may be connected for oscillatory rotation by chains 120 and 121 with sprockets on a shaft 122, suitably journaled in the main frame as at 123. Upon shaft 122 is fixed a pinion 124 meshing with a gear 125 upon a stub shaft 126. Also mounted on this stub shaft for rotation with gear 125 is a pinion 127 meshing with a gear 128 fast on a sleeve 129 freely revoluble on shaft 122. An arm 130 is also fast on sleeve 129 and carries at its end a cam roll 131 running in a cam groove 132 in the face of cam 30 opposite cam groove 54 previously described. By this or an equivalent train of mechanism shafts 118 and 119 are given an intermittent oscillation from the rotating main shaft 29.

Shafts 118 and 119 carry cam drums 135 and 136 respectively, a development of the surface of one of these being shown in Fig. 22. The operation of both cams being similar, a description of but one will be given, reference being had to Figs. 20, 21, and 22. The surface of the drum is provided with a plurality of sets of cam grooves, three as shown in Fig. 21, each set comprising four independent grooves 137, 138, 139, and 140 in the case shown. Cam rollers 141, 142, 143, and 144 run in grooves 137, 138, 139, and 140 respectively, and are pivoted on slides or rings 110, 111, 112, and 113 respectively by blocks 145, 146, 147, and 148. These blocks run in axial guiding grooves 149, 150, 151, and 152 in casing 115. Each block is provided with a detachable clamping portion 153 secured to the main portion of the block as by screws 154, and serving to clamp the block firmly to a portion 155 of the slide, the slide being suitably cut away around this portion to permit of the application of the clamp. Each block is secured to one of the slides, the other slides being cut away as at 156 to permit each slide to reciprocate according to the motion imparted to it by its cam grooves without interfering with the operation of the other slides. The use of a plurality of sets of cam grooves is desirable in order to avoid an unbalanced application of force to the rings with consequent liability of binding.

After the fabric shaping mechanism has completed its operation the hook 36 is swung back into its original position in which it can support the core by a reversal of the operations previously described for swinging the hook into inoperative position. Rolls 42 and 43 are then caused to descend, thus repositioning the core in place upon the hook. During part of this lowering of the core rolls 40 and 41 follow it down by gravity, their flanged sides furnishing lateral support for the core.

The operation of the shaping mechanism will now be described with relation to the several operations which are to be performed. In carrying out my method of tire building, and in using the machine described above, I prefer to follow the general plan outlined below. According to this preferred plan a plurality of machines are provided similar to that above described but with slight differences in the shape and operation of the shaping slides or cylinders, as will be described. These machines are preferably arranged in a series connected for successive operation on each core by a track shown at 39 in the drawing. Suitably located for action prior to each of these machines are devices which will place upon the tire building core successive layers of tire building material so that the side portions of the layers will extend down the sides of the core, sufficiently approximating a position in the plane of the core so that the shaping mechanism can act upon it. Such devices are not in themselves a part of my present invention and need not be specifically described, particularly as in the broader aspects of my invention the layers of fabric might be applied to the cores manually. A suitable apparatus and method for this purpose are described in my Patent No. 1,455,260, dated May 15, 1923.

Taking now the several steps of building a tire according to the preferred form of my invention I provide a sheet of rubberized fabric a, preferably in the form of an endless band (Fig. 1) composed of two plies and of a circumference substantially that of the base of the core. This fabric is then expanded over a core 35, the stretch given in this expansion producing a tension in the rubber with which the fabric is associated sufficient to cause the sides of the band to contract to substantially the position shown in Fig. 2. This layer of fabric extends down the sides of the core substantially parallel to the plane thereof, in which position it is ready for the shaping operation, illustrated in successive stages in Figs. 3, 4, and 5. In Figs. 3 and 4 the slides 111 and 112 have been shown as in the form of mechanism described above, these two slides operating together and without varying their relative positions in performing the operations shown in Figs. 3, 4, and 5 of shaping to the core the under-bead plies and positioning the bead fillers. In Fig. 5 I have shown slides 111 and 112 as united into a single slide 211, which is the preferable construction in this case, the slide operating mechanism being easily adapted for the operation of three slides instead of four. Slides 111 and 112, or 211, serve to position a bead filler b against the fabric and to assist in the shaping of the fabric, and accordingly the inner portion of the slide is shaped to conform to the outer contour of the bead filler.

Following now the successive stages of this first operation, starting with the fabric applied about the core with the side portions extending inwardly substantially parallel to the plane of the core, the opposed slides 113 first move against the core with a motion axial with respect to the core, and press the upper portions of the sides of the fabric against the core (Fig. 3), the inner portions of the slides being suitably shaped for this purpose as shown. Slides 110 next move against the core, forcing the edges of the fabric against the core (Fig. 4). Slides 111 and 112, or 211, then move to place the bead filler against the fabric, and to press the fabric which lies adjacent the bead filler against the core by the same operation (Fig. 5). It will be apparent from the drawings that slides 110 form supports for the inner circumferences of the annular bead fillers and furnish a guide serving to locate the fillers with accuracy against the fabric. This completes the under-bead and bead positioning operations. If desired the slides 111 and 112, or 211, may act before slides 110 so that the several slides will come into action successively from the outer to the inner portion of the fabric, as in the operation of shaping the over-bead plies to be described below, but the construction first described is generally preferable as it avoids any difficulty due to the bead filler sticking to fabric which has not reached its proper position adjacent the core. It will be seen from the above that each annular portion of the fabric which is pressed into conformation with the core is applied thereto in successive annular increments by circumferentially simultaneous axially directed pressure.

The core with the under-bead fabric and the beads so applied is removed on its hook from the shaping machine and a second layer of fabric c applied over it in such a manner as to cause the sides of the fabric layer to extend down the sides of the core in position for the operation of the over-bead shaping mechanism, as by stretching an endless band of the material over the core as described above. The application of this second layer is preferably performed by mechanism located along a continuation of track 39, the core being handled at that point by suitable mechanism which in its specific form constitutes no part of my present invention. The core with the fabric so mounted thereon is carried, preferably along a continuation of track 39, to a second mechanism similar in its general operation to that referred to in connection with the under-bead operation. The successive stages of the operation of this second shaping mechanism are shown in Figs. 6, 7, 8, and 9. The first stage, shown in Fig. 6, is the closing in of slides 113 upon the partially built up carcass upon the core to shape and press into contact with the previously laid fabric the upper portions of the inwardly projecting sides of the fabric. Slides 112 then move together to press the second layer of fabric above the bead filler (Fig. 7), slides 111 press it around the point of the filler (Fig. 8), and slides 110 press it under the filler (Fig. 9). In case each layer of fabric has consisted of two plies, as is preferable, and a four-ply casing is to be constructed, the building up of the carcass portion of the casing is now completed.

It now remains to complete the building up of the casing by the addition of the covering rubber. This operation is illustrated in Figs. 10, 11, 12, and 13, and is carried on in general in much the same way as the previously described operations. After the core is replaced on its hook and removed from the over-bead shaping machine the covering rubber is applied, preferably by mechanism situated adjacent a continuation of track 39. The covering rubber comprises a thread portion $d$ and sidewalls $e$, which in this case are applied to the carcass (indicated at $f$) so as to cause the sidewalls to extend down the sides of the core substantially parallel to the plane thereof, as in the case of the fabric used for constructing the carcass. Preferably, and as shown, chafing strips $g$, usually of square woven, bias-cut, rubberized fabric, are attached to the sidewalls and are applied and shaped at the same time. If desired, however, these strips may be omitted or applied later by hand or by other devices. After the composite covering band is thus applied over the carcass the core, with the casing elements mounted thereon, is carried into position in a shaping mechanism substantially like that described above, and having a plurality of slides 110, 111, 112, and 113 shaped much as the slides used in applying the over-bead plies of the carcass. In shaping the covering material the sidewall is pressed against the carcass by slides 113 and 112, acting successively as shown in Figs. 10 and 11. If the chafing strip is to be applied slides 111 and 110 act successively as shown in Figs. 12 and 13 to shape it around the bead portion of the carcass. In case the chafing strip is not to be applied by this mechanism slides 111 and 110 may be omitted, the shaping mechanism for the covering rubber in that event comprising but two slides.

The core handling apparatus is adapted for use in connection with other forms of fabric building operations if desired. For example, the lifting and guiding rolls may rotatably support the core so that it may be operated upon by the usual type of spinning or stitching rolls. In this case the core could be rotated by a friction roll contacting with its surface, and it would not be necessary to swing the hook completely out of the way as where it is desired to conform the fabric to the core by circumferentially simultaneous pressure.

It will be understood that the materials used in building up the tire casing are tacky or sticky, due to the uncured rubber of which they are composed or with which they are coated or impregnated; and that they are capable of distortion and shaping so that they may conform to the core. If these materials be stretched upon the core in such a manner that they shrink down its sides, they can be at once shaped and caused to adhere to each other by a simple pressure exerted axially of the core.

While in describing my invention I have illustrated it in connection with tire casings of the clincher type, it will be understood that it is also applicable to tires of other types such as straight side casings. The number of shaping slides used, and the mechanical structure to which I have referred in describing my invention, may be varied without departing from my invention which will now be pointed out, in its broader as well as its more specific aspects, in the appended claims.

Having thus described my invention, I claim:

1. A machine of the class described adapted for use in connection with a trackway from which cores may be supported by hooks, comprising means for pressing against both sides of a core material mounted thereon, means for raising and holding a core free of its supporting hook and in position for operation upon by the pressing means, and means for displacing the hook from a position obstructing access of said pressing means to the sides of the core.

2. An apparatus of the class described comprising means for supporting a tire building core having a layer of tire building material mounted thereon, spaced annular members shaped to conform to the side portions of the core and adapted to press the material thereagainst, said members being adapted to receive and carry a bead filler in the annular space between them, and means adapted to shift the bead filler against the side of the core.

3. An apparatus of the class described comprising means for supporting a tire building core having a layer of tire building material mounted thereon, spaced annular members shaped to conform to the side portions of the core and adapted to receive and carry a bead filler in the annular space between them, means for pressing said members against the core to shape the tire building material thereto, and means to shift the bead filler against the side of the core.

4. An apparatus of the class described comprising means for supporting a tire building core having a layer of tire building material mounted thereon, means for shaping said material to the sides of the core, and means for applying a bead filler thereto while said shaping means holds the material in place.

5. In a press of the character described for laying material for a pneumatic tire cover on a core, the combination with the core, of a press-element comprising a plurality of one-part rings arranged concentrically one within another and coaxially with the throughway axis of the core, and having their operative faces, that are directed towards the material, shaped to conform to the required contour of the material on the core, which rings are so mounted that when in operation they automatically come into contact with the material on the core successively commencing with the outer ring and finishing with the inner ring near the bead when all the rings are in contact with the material on the core, substantially as described.

THOMAS MIDGLEY.